United States Patent Office 3,579,477
Patented May 18, 1971

3,579,477
POLYESTER COATING AND MOLDING COMPOSITION
Samuel P. Vess, Marfa, Tex., assignor to Decor Dimensionals, Inc., Greenville, Tex.
No Drawing. Filed Sept. 3, 1968, Ser. No. 757,104
Int. Cl. C08k 1/02
U.S. Cl. 260—40
29 Claims

ABSTRACT OF THE DISCLOSURE

A composition and method for forming semi-flexible and rigid polyester articles and coatings which are vapor-permeable and liquid impervious. The compositions comprise mixtures of polyesters, expanded mineral fillers and a monomeric polymerizable solvent.

BACKGROUND OF THE INVENTION

Polyester based molding and coating compositions have been heretofore proposed. Generally, these polyester compositions comprise one or more ethylenically unsaturated polyesters dispersed or dissolved in a polymerizable monomeric solvent. Additives and/or filler may be added to the composition as desired. Also included in the compositions of the prior art are polymerization catalysts and promoters. After confining the composition in a mold of the desired configuration or after coating a substrate with the composition, the polyester based formulation is cured with the result that the polyester is further polymerized and cross-linked by the monomeric solvent to yield a solidified article or coating.

Although it has been heretofore suggested to form polyester articles for application to wood and similar construction materials and to apply polyester based coatings to wood, etc., the prior art formulations suffer from various disadvantages. First, the known polyester compositions are extremely heavy and rigid when cured and yield articles and coatings which are absolutely impervious to the passage of gases and/or vapors. While this may be a desirable property with respect to some applications, it is a distinct disadvantage when forming articles or coatings for application to wood and similar construction materials. The reason for this is that it is mandatory that wood and similar surfaces be permitted to "breathe" in order to prevent warpage and similar deleterious effects. In other words, it is essential that any article or coating adapted for application to wood surfaces permit the ingress and egress of moisture vapor, etc. to and from the wood surfaces. Inasmuch as the heretofore suggested polyester based molding and coating compositions result in completely insulative articles and coatings, this transmission of moisture and air vapor to and from the covered wooden surfaces is prohibited, thereby resulting in warpage and other adverse effects.

On the other hand, these polyester based coating and molding compositions are highly desirable for their advantageous properties, namely, their resistance to water and oxygen, acoustical properties, ease of formation, low cost, resistance to aging and heat, resistance to chemical attack, their lack of tendency to "cold flow" and their superior tensile strength.

It is an object therefore of the present invention to provide a polyester based coating and molding composition which provides a vapor-permeable but liquid-impervious article or coating particularly suited for application to wood and like materials.

It is a further object of the present invention to provide a polyester based coating and molding composition which is vapor-permeable and liquid-impervious while retaining the above noted advantageous properties.

It is a further object of the present invention to provide a method for producing polyester based articles and coatings which are vapor-permeable and liquid-impervious.

It is a further object of the present invention to provide polyester based articles and coatings which are vapor-permeable and liquid-impervious.

SUMMARY OF THE INVENTION

Briefly, the molding and coating compositions of the invention comprise mixtures of polyesters, expanded mineral fillers and a monomeric polymerizable solvent.

More particularly, the compositions of the invention comprise liquid compositions which upon curing harden into vapor-permeable, resinous elements impervious to liquids containing:

(a) A mixture of at least two polyesters, at least one of said polyesters being curable to a rigid state and at least one of the other of said polyesters being curable to a flexible state;

(b) A finely divided expanded mineral filler, and (c) An ethylenically unsaturated polymerizable monomeric solvent.

Preferably, the compositions of the invention additionally contain finely divided talc, a polymerization catalyst and an accelerator.

The invention further includes a method of producing a vapor-permeable, resinous element, (article or coating) impervious to liquids comprising forming a preform (article or coating) from the above described liquid compositions and curing said compositions to form a solidified element.

The present invention also includes polyester based articles and coatings formed from the above described compositions by the heretofore described methods which are vapor-permeable and liquid-impervious.

It has been discovered that the inclusion of a so-called expanded mineral filler in the polyester based compositions imparts thereto properties not shared by the coating and molding compositions of the prior art. Thus, the expanded mineral filler imparts to the resulting molded article and coating a micro-porous nature which is vapor-permeable but liquid-impervious. Moreover, the expanded and micro-porous mineral fillers impart to the polyester compositions in which they are incorporated a lightness, flexibility and ease of molding and application uncommon to the heretofore suggested polyester compositions.

DETAILED DESCRIPTION OF THE INVENTION

Any of the known and conventionally employed polyesters may be utilized in the compositions, methods, articles and coatings of the present invention. Preferably, these polyesters are ethylenically unsaturated polymeric ester reaction products of at least one polycarboxylic acid and at least one polyhydric alcohol. Preferably, the polyesters comprise reaction products of at least one ethylenically unsaturated dicarboxylic acid and at least one polyhydric alcohol. Optionally, the polyester may comprise the reaction product of a saturated carboxylic acid and an unsaturated polyhydric alcohol.

The polycarboxylic acids suitable for preparing the unsaturated polyesters include maleic acid or anhydride, fumaric acid, itaconic acid, citaconic acid, phthalic acid, adipic acid, pimelic acid, sebacic acid, succinic acid, etc.

Among the polyhydric alcohols which may be employed to prepare the polyesters are ethylene glycol, diethylene glycol, propylene glycol, etc. Unsaturated alcohols may be substituted in part for the above mentioned polyhydric alcohols. Suitable unsaturated alcohols include allyl alcohol, crotyl alcohol, etc.

Although it is generally preferred that the polycarboxylic acid constituent contain ethylenic unsaturation a polyhydric alcohol containing unsaturation may be reacted with a saturated dibasic acid to form the unsaturated polyester product.

Methods for the preparation of the polyesters are well known in the prior art. Thus, they may be prepared by conventional esterification methods, with or without a catalyst. Conventional esterification catalysts such as acids, e.g., sulfuric acid or Lewis acids, may be utilized. Generally, the reactants are re-fluxed in an inert solvent which may be utilized to remove water as an azeotrope. It is to be understood, however, that any of the known methods in the prior art for preparing the polyesters may be utilized.

It will be apparent that the specific properties of the various polyesters will depend upon the amounts and types of polycarboxylic acids and polyhydric alcohols employed in their preparation. Generally, certain of the polyesters form materials upon curing which are extremely rigid and inflexible. On the other hand, various other polyesters form flexible, rubber-like materials upon curing. According to the present invention, it is preferred to employ mixtures of the rigid and flexible polyesters in order to achieve the desired state of rigidity and/or flexibility.

For example, the compositions of the present invention are particularly adapted for the preparation of molded articles, decorative in nature and for forming coatings on wood and similar surfaces. Where it is desired to form molded articles, a more rigid product is desired. Accordingly, the amount of rigid polyester in the formulation will be greater than the amount of flexible polyester. When it is desired to form coatings, it is desirable that the resulting layer be semi-flexible. Accordingly, the amount of flexible resin in the coating formulation will be greater than the amount of the rigid polyester. More preferably, where it is desired to form a rigid molded article, the ratio of rigid polyester to flexible polyester in the molding composition should be about 2:1. The ratio of flexible polyester to rigid polyester in the coating compositions adapted to form semi-flexible coatings should be about 2:1.

The polymerizable monomeric solvents employed in the compositions of the present invention may be any of those conventionally employed in the prior art polyester compositions. Suitable, for example, are styrene, vinyl toluene, methyl methacrylate, diallyl phthalate, divinyl benzene, chlorostyrene, triallyl cyanurate, butadiene, diethyl maleate, etc.

Generally, an amount of polymerizable monomeric solvent in the range of about 12% to about 30% by volume of the composition may be employed. As noted above, the monomeric solvent serves to cross-link the polyester in the compositions upon curing to form a solidified mass.

Any known polymerization catalyst may be employed. Suitable examples include methyl ethyl ketone peroxide, benzoyl peroxide, lauryl peroxide, succinic acid peroxide, t-butyl perbenzoate, t-butyl hydroperoxide, acetyl peroxide, cyclohexanone peroxide, cumene hydroperoxide, etc.

The amounts of polymerization catalysts included in the coating and molding compositions may range from about 0.5 to about 3.0% by volume of the composition.

Polymerization promoters or accelerators may be added to the compositions to accelerate the decomposition of the catalyst into free radicals. These promoters or accellerators are well known in the prior art and include metallic salts such as cobalt naphthenate, manganese naphthenate, dimethyl aniline, quaternary amines and mercaptans.

Generally, an amount of accelerator or promoter from about 0.05 to about 0.20% by weight, based on the polyesters may be employed in the compositions.

It has been further found that the addition of finely divided talc to the compositions is advantageous. The talc serves as a filler and permits a reduction in the amount of the more expensive polyester ingredients without sacrificing the advantages thereof. It has been further found that for some unknown reason, talc is the only additional filler which may be incorporated in the compositions of the invention without deleteriously affecting the pot life thereof. The particle size of the talc should be from about 99 mesh to about 325 mesh and is included in the composition in an amount from about 0% to about 40% by weight, based on the polyester.

It will be understood that other additives, conventionally employed in the prior art, may be incorporated in the compositions of the present invention.

The mineral from which the expanded filler is derived may be any of the known minerals which, upon heating expand due to the loss of volatile material contained therein (mainly water) to form a light, porous aggregate. Many of these minerals are known; the most common of which are perlite and vermiculite. Perlite is the preferred filler; however, it is to be understood that any of the known expanded minerals may be employed as substitutes therefor.

Expanded perlite may be manufactured by any of the processes known in the prior art. Preferably, the expanded perlite is crushed and screened to a particle size ranging from about 100 mesh to about 300 mesh prior to incorporation in the coating and molding compositions.

Generally, an amount of finely divided perlite ranging from about 10% to about 30% by weight, based on the amount of polyester may be employed in the compositions. As stated above, due to the porous, cellular nature of the perlite filler, a micro-porous property is imparted to the cured, molded or coated polyester compositions of the present invention to impart thereto the highly desireable property of vapor-permeability and liquid-imperviousness.

Rigid, decorative articles may be formed from the compositions of the present invention by confining the polyester compositions of the invention in a mold of the desired configuration and heating to effect curing thereof. Generally, temperatures in the range of from about 150 to about 300° F. may be employed to cure the compositions of the invention. Obviously, the particular temperature employed in any instance will depend upon the particular polyester employed in the molding composition. Advantageously, the compositions are molded in a polyvinyl chloride mold preliminarily coated with a release agent, e.g., a mixture of nitrocellulose and silicone.

The rigid article forming compositions of the present invention are particularly suitable for the formation of decorative elements such as plaques, etc. although it is to be understood any rigid article may be molded therefrom. The articles are, due to the presence of the microporous mineral filler, lighter than those in the prior art and possess the property of being vapor-permeable but liquid impervious.

Substrates such as wood and similar construction materials subject to warping may be coated with the compositions of the present invention which yield semi-flexible coatings. Generally, the substrate is coated to any desired thickness with the coating composition and either heated to effect curing or allowed to stand until curing is achieved. Obviously, heating the coating will result in an accelerated cure. The coating compositions and methods of the invention are particularly suitable for coating wooden substrates such as doors, walls, to provide a vapor-permeable but liquid-impervious, decorative coating thereon which will prevent warpage of a wooden substrate.

The invention will be illustrated by the following non-limiting examples:

Example 1

A decorative laminate was applied to a wood door surface using a type I 30 x 70 x 1¾ Luan hollow core door 15 and a catalyst activated formula of polyester resins and additives according to the present invention.

(A) *Preparation of door.*—The raw wood surface was dried, cleaned, and rough sanded. No treatment such as priming is necessary. The polyester based coating integrates itself with the wood without need for priming thus forming a permanent bond.

(B) *Preparation of coating composition.*—21 pounds polyester flexible resin [1], 14 pounds polyester rigid resin [2], and 18 grams dimethylaniline (DMA) were mixed and agitated for 5 minutes. 9 pounds talc having a particle size of 200 mesh and 4 pounds perlite aggregates having a particle size of 200 mesh were added and the mixture agitated for 10 minutes. The above material is adequate to coat approximately 250 square feet of surface. The use of talc and perlite provides approximately a 35% gain in volume with a decrease in quality of only about 5%.

(C) *Laminate.*—For the 30 x 70 x 1¾ standard size exterior door, weigh into clean container 3½ pounds of prepared ester formula. Add 7 grams 2% by weight of methylethyl ketone peroxide 60% (MEKP "60"). Agitate the mix thoroughly, pour onto the door surface and immediately spread with broad knife sptaulas into a very even coating on entire door surface.

(D) *Stipple.*—A pebble stipple comprising irregular but smooth textured mountains and valleys of various sizes ¼ inch to ½ inch in area and 15 to 60 mils in thickness was embossed in the coating using a hard rubber roller with metal facets spaced irregularly around the surface. The coating was rolled from top to bottom following the general direction of the original grain. The rolling will immediately begin to form the desired indentations; i.e., mountains and valleys. The point of no return was reached in approximately 2 minutes. The laminate was then in a state of exotherm or a chemical reaction of hardening or curing. The coating was sufficiently cured after about 20 minutes after the start of step C.

Example 2

A decorative laminate was applied to a wood surface in this example using a type I 30 x 70 x 1¾ Luan hollow core door 15 and a catalyst activated formula of polyester resins and additives according to the invention.

(A) *Preparation of door.*—The raw wood surface was dried, cleaned, and rough sanded.

(B) *Preparation of material.*—21 pounds polyester flex resin [3], 14 pounds polyester rigid resin [4], and 18 grams dimethylaniline (DMA) were mixed for 5 minutes. 8 pounds of perlite aggregate having a particle size of 200 mesh was added and the mixture agitated for 10 minutes.

The above mix is sufficient for approximately 200 square feet of surface area.

(C) *Laminate.*—For a 30 x 70 x 1¾ standard size exterior door, weigh into clean container 3½ pounds of

[1] 31–851 Polylite (Reichhold):
Viscosity, Brookfield at 77° F.—300–450 cps.
Color APHA—125 max.
Specific gravity—1.12–1.14.
Weight per gallon—9.4–9.6 lbs.
PROPERTIES OF CURED UNFILLED CASTINGS OF 31–851 POLYLITE
Shore D hardness—55.
Tensile strength—1300 p.s.i.
Flexural strength—Yields.
Flexural modulus—Yields.
Compressive strength—Yields.
Heat distortion point—Yields.
Elongation—55%.

[2] 32–153 Polylite (Reichhold):
Viscosity, cps.—880–1070.
Specific gravity—1.10–1.12.
Weight per gallon—9.17–9.34.
Percent polymerizable—100.
Color—Light pink.
PROPERTIES OF CURED POLYLITE 32–153
Tensile strength, p.s.i.—8,500–10,000.
Flexural strength, p.s.i.—11,000–13,000.
Flexural modulus, p.s.i. 6.23 x 105.
Compressive strength, p.s.i.—21,000–23,000.
Barcol Hardness—43–45.

[3] Polylite 31–851.
[4] Polylite 32–153.

prepared ester formula. Add 7 grams 2% by weight of methylethyl ketone peroxide 60% (MEKP "60"). Agitate the mix thoroughly, pour onto the door surface and immediately spread with broad knife spatulas into a very even coating on entire door surface.

(D) *Stipple.*—A stria stipple effect was achieved by embossing the coating with a metal roller containing lands and grooves of varying widths and depths. A pattern of an irregular series of lines forming mountains and valleys varying in width from ¹⁄₁₆ inch to ³⁄₁₆ inch and in depth from 15 to 50 mils was formed by rolling in the direction of the grain.

The coating was cured as in Example 1.

Example 3

A decorative applique, panel, or piece was molded in an open face flexible polyvinyl chloride mold cavity, using the formula in Example No. 1.

(A) *Preparation of mold cavity.*—A release agent (nitrocellulose + silicone) was applied to the mold surface.

(B) 5 pounds of polyester formula was then catalyzed as in Example 1 and poured into the mold cavity. A vibrolator attached to the mold was then turned on for approximately 30 seconds. Peak exotherm or gel time was reached in approximately 6 to 8 minutes.

(C) Immediately following the peak exotherm or gel time the piece is peeled from the mold cavity (complete curing and hardening is finished outside the mold cavity in approximately 1 hour).

A rigid article was formed which was found to be microporous, vapor permeable and impervious to the passage of liquids.

Example 4

This example describes a process of applying a decorative panel to a laminate or wood surface using the formula or mix as defined in specific Example No. 1.

(A) *Preparation.*—The surface of both the applique piece and the receiving area was cleaned and dried.

(B) The exact location of the applique was marked with a template on the receiving surface. It was then removed and turned back side up.

(C) *Adhesive.*—The polyester formula of Example No. 2 was catalyzed as in Example No. 2 and coated on the back side of the applique piece approximately 60 mils thick. The applique or piece was then positioned back into the predetermined area and clamped into place. In approximately 20 minutes the bond was secure.

Upon removal of the clamp the applique was found to be securely bonded to the surface.

What is claimed is:

1. A curable composition for coating or molding comprising:

a mixture of at least two polyesters, one of said polyesters being curable to a rigid state and another polyester being curable to a flexible state wherein the ratio of rigid polyester to flexible polyester is greater than about 0.5:1;

expanded mineral filler taken from the group consisting of perlite and vermiculite, in an amount from about 10% to about 30% by weight of said polyester resins.

2. The composition of claim 1 including polymerizable monomer solvent, talc, and curing catalyst.

3. The composition of claim 1 wherein the ratio of rigid to flexible polyester resins is from about 0.5:1 to about 2:1.

4. The composition of claim 2 further including a catalyst accelerator.

5. A method of producing a vapor permeable, resinous element impervious to liquids comprising:

(a) preparing a preform employing the composition recited in claim 1; and (b) curing the preform.

6. The composition of claim 2 wherein said curing catalyst is a peroxide.

7. The composition of claim 6 wherein said peroxide is methylethylketone peroxide.

8. The composition of claim 4 wherein said accelerator is selected from the group consisting of metallic salts, amines, quaternary amines and mercaptans.

9. The composition of claim 1 wherein said expanded mineral is perlite.

10. The composition of claim 1 including polymerizable monomer solvent as a cross-linking agent for said polyesters.

11. The composition of claim 1 wherein said polyesters are ethylenically unsaturated polymeric ester reaction products of at least one polycarboxylic acid and at least one polyhydric alcohol.

12. The composition of claim 1 wherein the ratio of said flexible polyester to said rigid polyester is greater than about 1:1.

13. The composition of claim 1 wherein the ratio of said rigid polyester to said flexible polyester is greater than about 1:1.

14. A liquid composition which upon curing hardens into a resinous, vapor-permeable layer impervious to liquids comprising:
 (a) a mixture of at least two polyesters, at least one of said polyesters being curable to a rigid state, at least one of the other of said polyesters being curable to a flexible state, said polyesters comprising ethylenically unsaturated polymeric ester reaction products of at least one dicarboxylic acid and at least one polyhydric alcohol;
 (b) from about 10% to about 30% finely divided expanded perlite having a particle size of from about 100 mesh to about 300 mesh;
 (c) from about 0 to about 40% talc having a particle size of from about 9 to about 325 mesh;
 (d) from .5 to about 3% of a polymerization catalyst;
 (e) from about 0.05% to about 0.20% of a polymerization accelerator, and
 (f) up to about 30% of an ethylenically unsaturated polymerizable monomer solvent.
  said percentages of perlite, talc, and polymerization accelerator being by weight and based upon the amount of said polyesters,
  said percentages of polymerization catalyst and monomer solvent being by volume of the composition.

15. The composition of claim 14 wherein the ratio of said flexible polyester to said rigid polyester is about 2:1.

16. The composition of claim 14 wherein the ratio of said rigid polyester to said flexible polyester is about 2:1.

17. A method of producing a vapor-permeable, resinous element impervious to liquids comprising forming a preform from the composition of claim 14 and curing said layer.

18. A method of producing a rigid, self-supporting, vapor-permeable resinous article impervious to liquids comprising confining the compositions of claim 16 in a mold of the desired configuration and curing said composition.

19. A method of producing a semi-flexible, vapor-permeable, liquid impervious resinous coating on a substrate comprising applying to said substrate the composition of claim 15 and curing said composition.

20. The method of claim 19 wherein said substrate is wood and said composition forms a mechanical bond and a chemical bond with said wood upon curing.

21. A vapor-permeable, liquid-impervious element produced by the process of claim 5.

22. A vapor-permeable, liquid-impervious, element produced by the process of claim 17.

23. A rigid, self-supporting, vapor-permeable, liquid-impervious article produced by the process of claim 18.

24. An article of manufacture produced according to the method of claim 19.

25. An article of manufacture produced according to the method of claim 20.

26. A composition of matter characterized as being vapor permeable, liquid impermeable and directly bondable to a substrate comprising the reaction product of a mixture of at least two polyester resins, a curing agent and an expanded mineral filler, taken from the group consisting of perlite and vermiculite one of said polyester resins being curable to a rigid state and another of said resins being curable to a flexible state, the ratio of rigid to flexible resin being from about 0.5:1 to about 2:1, and said expanded mineral filler being present in an amount of at least about 10% by weight of said polyester resins whereby vapor permeable properties of said composition are enhanced.

27. The composition of claim 26 wherein said expanded mineral filler is perlite and is present in an amount from about 10% to about 30% by weight.

28. A method of treating a wood surface comprising:
 (a) preparing the surface for receiving a vapor-permeable, liquid impermeable resinous material;
 (b) providing a resinous composition curable into a vapor-permeable, liquid impermeable layer, said composition comprising a mixture of at least two polyester resins, at least one of said resins being curable to a rigid state and at least the other of said resins being curable to a flexible state, a cross-linking agent, and an effective amount of expanded mineral filler sufficient to impart vapor-permeable properties to said resin after curing in-situ, said expanded mineral filler being present in an amount of at least about 10% by weight;
 (c) applying said resinous composition to said surface and curing said coated surface in situ whereby the cured resinous composition is permanently bonded to the surface and renders same resistant to warpage.

29. The method of claim 28 wherein said expanded mineral filler is perlite and is present in an amount from about 10% to about 30% by weight.

References Cited
UNITED STATES PATENTS

| | | | |
|---|---|---|---|
| 2,516,309 | 7/1950 | Fraser | 260—869 |
| 2,642,410 | 6/1953 | Hoppens | 260—869 |
| 3,214,491 | 10/1965 | Stanton | 260—871 |

OTHER REFERENCES

Ladoo & Myers; Nonmetallic Minerals, 1951, page 378.

Modern Plastics Encyclopedia for 1965, vol. 42, No. 1A, McGraw-Hill, Inc., New York (September 1964) page. 530.

Rose, Arthur and Elizabeth; The Condensed Chemical Dictionary, 7th ed., Reinhold Publishing Corp., New York (1966), pages, 1003–4.

MORRIS LIEBMAN, Primary Examiner

S. M. PERSON, Assistant Examiner

U.S. Cl. X.R.

117—148; 260—871